March 17, 1936.

S. H. CALKINS

Re. 19,891

PATTERN AND GUIDE STRIP

Original Filed Aug. 31, 1920

INVENTOR.

Leonard Homer Calkins

Reissued Mar. 17, 1936

Re. 19,891

UNITED STATES PATENT OFFICE 19,891

PATTERN AND GUIDE STRIP

Seward Homer Calkins, Audubon, N. J., assignor to The Traitel Marble Company, Long Island City, N. Y., a corporation of New York Original No. 1,451,491, dated April 10, 1923, Serial No. 407,094, August 31, 1920. Application for reissue April 22, 1933, Serial No. 667,469

17 Claims. (Cl. 94—17)

This invention relates to pattern and guide strips for plastic work particularly for flooring and has as one of the objects to provide an improved device which may be easily and accurately placed in position and which will permit ready deposit and finishing of a wall or floor coating of a number of different colors without permitting the various colors to commingle.

Another object of the invention is to provide a guide strip which has a straight uninterrupted top and bottom edge formed with means for holding the plastic material in position and at the same time presenting a straight leveling edge at the top.

A further object of the invention is to provide a strip for holding plastic floors and walls and the like in place and at the same time present retaining means for the plastic material while presenting expansion means during the life of the floor or wall.

A still further object is to provide a flexible strip having improved means for supporting the same upon a plastic bed and to so arrange the supporting means that the strip may be readily bent into various curved formations so that it will greatly aid in the formation of unusual curved designs in walls or flooring.

In the accompanying drawing—

In providing floors for modern buildings and other places, it is customary to provide concrete coverings and in providing this form of flooring the material must be properly mixed and placed in position in a plastic condition and left standing until it is seasoned or hardened. In some instances, walls and ceilings are also provided with cement coatings and they must be formed substantially in the same manner as concrete floors. Where the concrete floor is to be formed as a "mosaic" as for instance what is known as a "terrazzo mosaic," the concrete is mixed with coloring matter if desired and also with marble or other material and is pressed by any suitable means, as for instance, a roller. After it has been arranged in place, said pressure continuing until the texture is comparatively closed. After this has been done, the prepared flooring, ceiling or wall is allowed to season or harden to a certain extent which usually requires several days. This seasoning or hardening must not be carried too far before the finishing of the floor or other coating is carried out, said finishing being done by grinding either manually or by a machine. If this finishing or grinding is done before the flooring has properly set, it will grind away to an undesirable extent and the finishing will be poor by reason of the softness of the material. If the floor is allowed to set too long it becomes too hard for proper grinding so that the workers in producing "terrazzo mosaic" floors must grind the flooring at approximately the correct time to secure the best results.

Where a number of colors are to be used in a floor and arranged in different designs, a partition or division members must be provided for holding the different batches of material in proper place until they have set to a certain extent.

After the first batch has set, a second batch or some other part of the floor is provided and so on until all of the floor has been covered by several batches of material of different colors according to the design desired. By this method, which has been known for some time, the different batches or different ages must all be finished at once with a result that some of it is finished while it is rather soft and other parts are finished after they have become undesirably hard. To obviate this condition, the strips shown in the accompanying drawing have been provided which permit all of the coating to be supplied substantially at one time, and, consequently, to season to the same extent whereby it may be ground at exactly the correct time.

Figure 4:
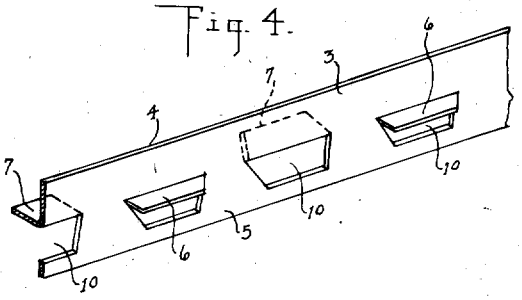
Figure 4 is a perspective view of the strip shown in Figure 2.

Referring to the accompanying drawing by numerals 1 indicates a flooring which is provided with a number of ornamental sections 2, separated by strips 3 of metal formed according to the present invention. As shown in Figure 4 the strips 3 are of thin metal as for instance, brass, and are provided with upper and lower straight edges 4 and 5, said edges being continuous from one end of the strip to the other. The strip is punched out for forming oppositely extending ears 6 and 7, said ears extending substantially at right angles to the flat faces of the strip 3. It will be noted that in pressing out these ears they are pressed out of the lower half of the strip but do not extend to the bottom edge. This arrangement is provided in order that when the bed 8 has been provided on the foundation 9 and is still green, the lower edge 5 of the strip 3 may be forced therein until the ears 6 and 7 press against said bed. The bed 8 or underbed will naturally resist this action somewhat but the strip may be readily placed in position and the slight resistance offered will cause the bed 8, which is a concrete mixture, to flow into the various openings 10 formed by the pressing out of the ears 6 and 7. This arrangement provides an anchor for locking the strips in place and to the bed 8. Thus the longitudinal bridge portions 10′ of the strip at the lower side of each of the openings 10 act to firmly anchor the strip in the under-bed so that it cannot work upwardly therethrough. The horizontally disposed ear 6 at the upper side of each opening 10 exerts a tamping action upon the plastic material to press the same closely into the openings 10 above the anchor bridges 10′. After the strip has been thus placed in position, the ornamental concrete aggregate 11 or top layer is deposited on top of bed 8 and is rolled or pressed in place in any desired manner. The straight edge 4 of the strip 5 permits easy leveling of the aggregate.

Figure 1:
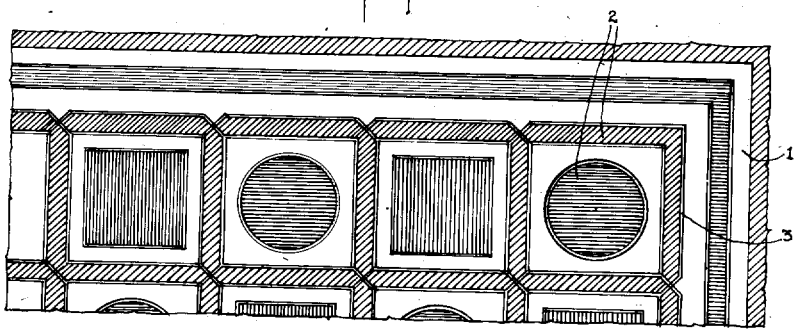
Figure 1 is a top plan view of part of a floor showing designs having a guide strip embodying the invention used for holding the different colors in the material separated.
Figure 2:
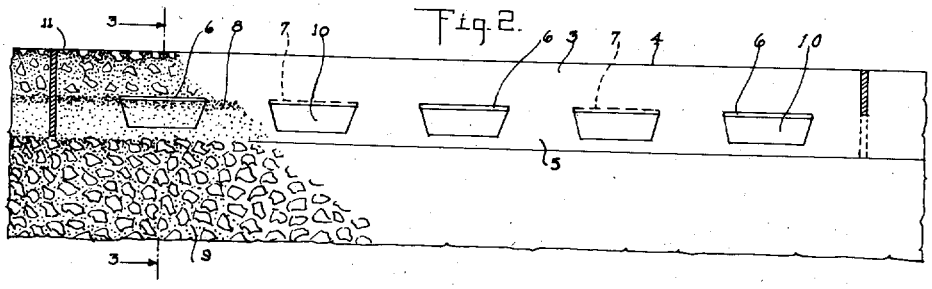
Figure 2 is a fragmentary sectional view through a flooring disclosing an embodiment of the invention.
Figure 3:
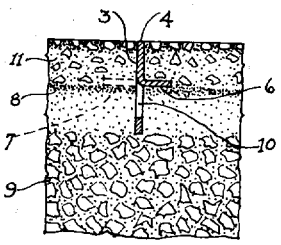
Figure 3 is a transverse sectional view through Figure 2 on line 3—3.

After the design has been formed as shown in Figure 1, it is left to season or harden and when in the proper condition the entire surface is ground. With the strip 3 of brass or some other comparatively soft metal, they will grind away with the aggregate 11, and consequently, the upper edge of the strip will be flush with the remaining part of the floor when the floor is completed.

Figure 5:
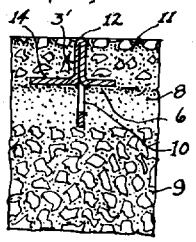
Figure 5 is a sectional view similar to Figure 3 but disclosing a different form of strip, the flooring being shown in an unfinished condition.
Figure 6:
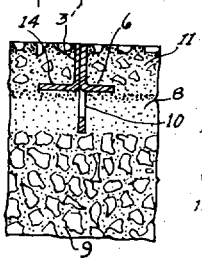
Figure 6 is a view similar to Figure 5 with the flooring in a finished condition.
Figure 7:
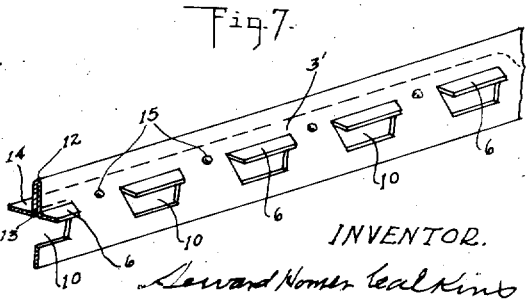
Figure 7 is a perspective view similar to Figure 4 but disclosing the form of strip illustrated in Figures 5 and 6.

In Figures 5 and 7 will be seen a slight modified form of the invention in which the strip 3′ is bent back upon itself at 12 and bent again at 13 forming a longitudinal flange or ear 14 which acts similar to the ear 7 while the body of the strip 3′ is provided with a number of pressed out ears 6 leaving openings 10 as shown in Figure 4. The flange 14 is in the same horizontal plane as ear 6 similarly to the arrangement of ears 6 and 7 which are in the same horizontal plane. The strip 3′ is pressed in position in a similar manner to strip 4 and assumes substantially the position shown in Figure 5 when the floor is completely laid but not ground. During the grinding action the upper part of the floor is, of course, ground away and the bent edge 12 is also ground away so that there will be arranged two parallel metal strips presenting an expansion joint which will readily take care of any expansion of the floor. This structure, as well as that shown in Figure 4 will act also as anchoring means for preventing warping or curling of the floor during the curing thereof.

If desired, a number of rivets or other fastening means 15 could be provided on strip 3′, said rivets being near the bent edge 13. These rivets when used act to tie the parts together adjacent the upper edge of the bed 8 after the edge 12 has been ground off.

What I claim is:—

1. A pattern and guide strip comprising a flat strip of metal bent centrally along its longitudinal center producing right and left plates, one of said plates being bent at right angles to the other plate along a longitudinal central line for presenting a supporting flange, while the other plate is formed with a number of pressed out ears extending in an opposite direction to the flange but in the same plane.

2. A pattern and guide strip comprising a thin strip of metal bent along a longitudinal central line so as to form parallel plates, one of said plates being also bent at right angles to the remaining plate to form a longitudinal supporting flange, said remaining plate having a plurality of pressed out ears arranged in the same plane as the flange but extending in the opposite direction and fastening means extending through said plates, said fastening means being spaced from the upper edge.

3. A pattern and guide strip comprising a flexible strip of metal adapted to be forced vertically into a body of plastic material, said metal strip being provided with longitudinally spaced openings therein intermediate its opposite edges and having means projecting horizontally from one side of the strip at the upper edge of each opening, said means constituting stops limiting the penetration of one edge of the strip into the plastic material and also acting to tamp the material and urge the same within said openings.

4. A pattern and guide strip comprising a flexible strip of metal adapted to be forced vertically into a body of plastic material, said metal strip being provided with longitudinally spaced openings therein and having means projecting horizontally from one edge of each opening to limit the penetration of one edge of the strip in the plastic material and to tamp the material within said openings, said strip also having means at the opposite edge of each opening acting to firmly anchor the strip in the plastic material against an upward vertical movement.

5. A pattern and guide strip comprising a thin strip of metal having longitudinally elongated space openings therein and ears projecting horizontally from one side of the strip at the upper edges of said openings and co-extensive in length with said openings, said ears constituting stops limiting the penetration of the lower edge portion of the strip into a body of plastic material, and also acting to tamp the plastic material into said openings.

6. A pattern and guide strip for floors of plastic material having longitudinally spaced ears pressed out of said strip and extending at right angles to the plane thereof, said ears providing openings in the strip bridged at the sides of said openings remote from the ears by longitudinally extending body portions of the strip, the edge portion of the strip having said openings therein adapted to be embedded in a body of plastic material, said openings receiving the plastic material of the underbed and the bridge portions of said strip at the sides of the openings constituting anchor means preventing upward movement of the strip in the underbed.

7. A pattern and guide strip for floors of plastic material comprising a thin strip of metal bent to provide a continuous longitudinal flange projecting horizontally from one side of the body of the strip and at right angles to the plane thereof, the body of the strip being provided at one side of the flange with longitudinally spaced openings therein, said flange constituting a stop to limit the penetration of one edge of the strip into a body of plastic material, and also acting to tamp the plastic material into said openings.

8. A pattern and guide strip for floors of plastic material comprising a thin metal strip bent to provide a continuous longitudinal flange projecting from one side of the body of the strip intermediate of its opposite edges, said metal strip being also provided with spaced ears projecting from the opposite side of the strip in the plane of said flange and an opening in the body of the strip beneath each of said ears, said flange and the ears constituting stops limiting the penetration of one edge of the strip into a body of plastic material, and also acting to tamp the material in said openings.

9. In combination with a terrazzo flooring having an underbed and a top layer, a pattern and guide strip comprising a flat strip of metal having upper and lower uninterrupted straight edges, and a plurality of ears pressed out of said strip and positioned to extend on opposite sides thereof substantially from the center of the strip, spaced openings in said strip, said ears constituting means engaging said underbed and limiting the penetration of the edge of the strip, tamping the material and urging the same within the openings.

10. In terrazzo or the like flooring having an underbed and a top layer, a pattern and guide strip comprising a thin strip of metal having a plurality of ears pressed out horizontally from the body of the strip forming longitudinally spaced openings, said ears constituting means engaging said underbed and limiting the penetration of the edge of the strip, tamping the material and urging the same within the openings, said openings being defined at their lower margins by bridges positioned in engagement with the material of the underbed, the material of the flooring extending through such openings to lock the strips in the flooring.

11. In terrazzo or the like flooring having an underbed and a top layer, a pattern and guide strip comprising a thin strip of metal having a plurality of ears pressed out horizontally from the lower portion of the body of the strip forming longitudinally spaced openings, said ears constituting means engaging said underbed and limiting the penetration of the edge of the strip, tamping the material and urging the same within the openings, said openings being defined at their lower margins by bridges positioned in engagement with the material of the underbed, the material of the underbed extending through such openings to lock the strips in the flooring, the upper edge of the strip being flush with the upper surface of the top layer.

12. In terrazzo or the like flooring having an underbed and a top layer, a pattern and guide strip comprising a thin strip of metal having a plurality of ears pressed out horizontally from the lower portion of the body of the strip substantially at right angles thereto forming longitudinally spaced openings defined at their lower margins by bridges positioned in engagement with the material of the underbed, the material of the underbed extending through such openings to lock the strips in the flooring, said ears being substantially in line with the upper surface of the underbed.

13. In terrazzo or the like flooring having an underbed and a top layer, a pattern and guide strip comprising a thin strip of metal having a plurality of ears pressed out horizontally from the lower portion of the strip substantially at right angles thereto, said ears being substantially in line with the upper surface of the underbed.

14. In terrazzo or the like flooring having an underbed and a top layer, a pattern and guide strip comprising a thin strip of metal having a plurality of ears pressed out horizontally from the lower portion of the body of the strip substantially at right angles thereto forming longitudinally spaced openings defined at their lower margins by bridges positioned in engagement with the material of the underbed, the material of the underbed extending through such openings to lock the strips in the flooring, said ears being substantially in line with the upper surface of the underbed, the upper edge of the strip being flush with the upper surface of the top layer.

15. In terrazzo or the like flooring, having an underbed and a top layer, a pattern and guide strip comprising a thin strip of flexible metal, to provide a pattern for a terrazzo floor design and provided with ends extending in the same plane as the body of the strip and having upper and lower uninterrupted straight edges, a plurality of ears punched outwardly from the body of the strip, with the lower edge of the strip secured in the underbed by being forced thereinto, spaced openings in said strip, said ears constituting means engaging said underbed and limiting the penetration of the edge of the strip, tamping the material and urging the same within the openings, portions of the underbed being within said openings, the upper edge of the strip being flush with the top surface of the top layer and with said top layer exhibiting a predetermined design.

16. In terrazzo or the like flooring, having an underbed and a top layer, a pattern and guide strip comprising a thin strip of metal, to provide a pattern for a terrazzo floor design and a plurality of projections punched outwardly from the body of the strip, with the lower edge of the strip secured in the underbed by being forced thereinto, spaced openings in said strip, said projections constituting means engaging said underbed and limiting the penetration of the edge of the strip, tamping the material and urging the same within the openings, portions of the underbed being within said openings, the upper edge of the strip being flush with the top surface of the top layer and with said top layer exhibiting a predetermined design.

17. In terrazzo or the like flooring having an underbed and a top layer, a pattern and guide strip comprising a thin strip of metal having a plurality of ears pressed out from the body of the strip forming longitudinally spaced openings, said ears constituting means engaging said underbed and limiting the penetration of the edge of the strip, tamping the material and urging the same within the openings, the material of the underbed extending through such openings to lock the strips in the flooring, the upper edge of the strip being flush with the upper surface of the top layer.

SEWARD HOMER CALKINS.